United States Patent [19]
Jacobson et al.

[11] 4,118,930
[45] Oct. 10, 1978

[54] FILTER-COOLER

[75] Inventors: Michael D. Jacobson, Ridgecrest; G. Franklin Grouwinkel, Monterey Park, both of Calif.

[73] Assignee: The United States of America as represented by the Secretary of the Navy, Washington, D.C.

[21] Appl. No.: 480,189

[22] Filed: Jun. 14, 1974

[51] Int. Cl.² .............................................. F02K 11/00
[52] U.S. Cl. ........................................ 60/266; 60/231; 60/253; 60/257
[58] Field of Search ................ 60/228, 230, 231, 266; 102/39; 55/345, 482; 239/265.23, 127.3

[56] References Cited
U.S. PATENT DOCUMENTS

| | | | |
|---|---|---|---|
| 2,774,444 | 12/1956 | Soddy | 55/345 |
| 2,779,281 | 1/1957 | Maurice et al. | 102/39 |
| 3,070,957 | 1/1963 | McCorkle | 239/127.3 |
| 3,132,478 | 5/1964 | Thielman | 239/265.23 |
| 3,147,590 | 9/1964 | Thielman | 60/231 |
| 3,225,526 | 12/1965 | Bayles et al. | 55/482 |
| 3,771,292 | 11/1973 | Hamilton et al. | 55/345 |

Primary Examiner—Samuel Feinberg
Attorney, Agent, or Firm—R. S. Sciascia; Roy Miller; Thomas W. Hennen

[57] ABSTRACT

A filter-cooler is provided for use with a rocket motor to cool and filter highly aluminized hot gases from around 5800° F. to around 2000° F. The cooled and filtered gases are then usable, for example, in thrust vector control or other mechanisms associated with the rocket. In the present system the cooler section is placed ahead of the filter section so that alumina present in the gases begins to solidify ahead of the filter and thus may be more efficiently removed. The filter section comprises a plurality of graphite vortex producing geometries. The vortex direction of the baffles is reversed in succeeding baffles so that the net effect of the high rotational velocities of each vortex is used to separate the particulate contaminates from the gas stream by momentum.

9 Claims, 3 Drawing Figures

FILTER-COOLER

CROSS REFERENCE TO RELATED APPLICATION

The device disclosed in this application is similar in some respects to assignee's copending application Ser. No. 480,188 filed June 14, 1974 now U.S. Pat. No. 3,988,888.

BACKGROUND OF THE INVENTION

This invention relates to rocket motors and particularly to the use of rocket motor bleed gases for actuation of rocket control devices. It has been found that the main rocket motor chamber can supply gas for actuation of thrust vector control means and thrust modulation control devices, for example, without impairing motor performance. However, this concept of conditioning motor bleed gases is fairly new and there are only a few designs using this concept. Of these designs, only a very few use a decomposing chemical to cool the gases and none are known which use a coolant as an aid to the filtration of alumina.

It appears to have been the consensus in the trade that aluminum oxide in hot hot gases could be easily filtered without cooling. However, such ease of filtration has not been found to be the case. At elevated temperatures the aluminum or its compounds in the gases emanating from a rocket motor chamber are in liquid form and very difficult or impossible to remove by filtration. According to the present invention a filter-cooler is provided which considerably lowers the temperature of the hot gases before filtering so that alumina in the gases solidifies and is more easily and efficiently removed, and the gases are, therefore, converted into gases suitable to operate auxiliary power devices.

Known prior art devices have relied principally upon gravity separation of the solid particles or porous type line filters. The principal disadvantage of the gravity filter is that a large free volume is needed to accomplish filtration. The in-line porous filter must have a large projected area to avoid plugging by the filtrate. According to the present invention a plurality of baffles having vortex producing port geometries are placed in series in the path of the gases. The rotational direction of each baffle is reversed in relation to the preceding baffle and the net effect is that the high rotational velocity of the generated vortex is used to separate the particulate contaminates from the gas stream by momentum. The contaminates then are carried radially by centrifugal force to the perimeter of the filter where they collect.

DESCRIPTION AND OPERATION

Figure 1:
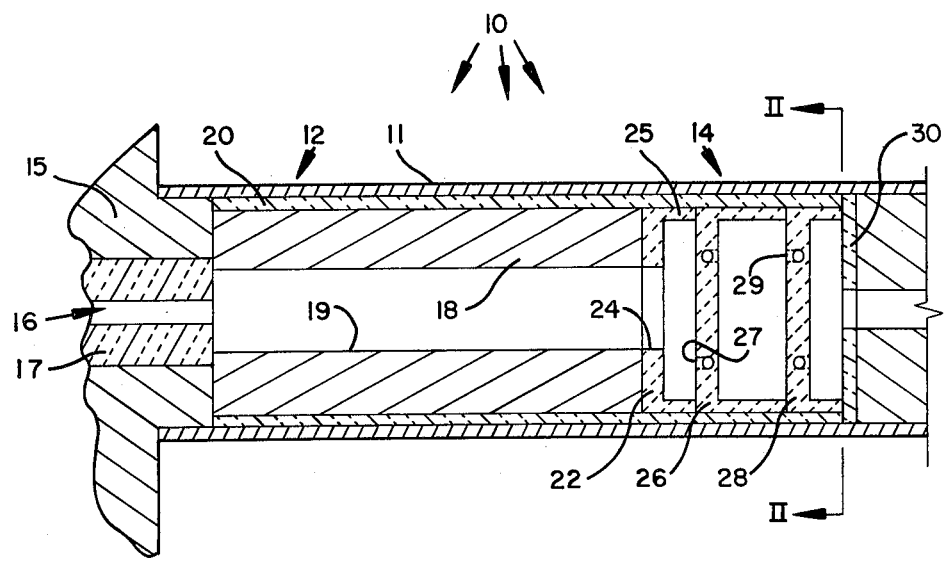
FIG. 1 is a longitudinal cross-sectional view of a filter-cooler according to the invention.

Shown in FIG. 1 is a filter-cooler 10 comprising a metal casing 11 housing a coolant section 12 and a filter section 14. The device is attached to a rocket motor (not shown) by means of a fixture 15, and hot motor gases 16 are bled through an insulative tube 17 of asbestos phenolic or the like.

The coolant section 12 comprises a hollow cylinder of decomposable chemical coolant 18 having a central bore 19 substantially coaxial with the tube 17. The coolant material is insulated from the casing 11 by a sleeve 20 of insulative material preferably of the same asbestos phenolic material as in 17 above. Examples of decomposing chemical coolant materials include ammonium formate, calcium carbonate, ammonium fluoride, and ammonium acetate. Some of these coolant materials may also be advantageously combined with a Teflon or polyvinyl acetate binder. For example, one embodiment tested comprised ammonium formate with a 16% Teflon binder. Another embodiment tested consisted of 90% succinic acid by weight with 10% by weight of polyvinyl acetate binder. Further details of the coolant materials may be had by reference to assignee's copending application mentioned above. The following table indicates test results with various coolant materials where the temperature of the entering gases was 5800° F.

TABLE

| Coolant | Avg Temp | Max Temp | Avg M* | Comments |
|---|---|---|---|---|
| Ammonium formate | 1000° F | 1300° F | .013 | Exhaust nozzle plugged, unsatisfactory coolant |
| Graphite | 2600° F | 2900° F | .120 | Using effective filtration, fair coolant |
| Ammonium formate + Teflon | 2300° F | 2650° F | .075 | Considerable initial smoke, good coolant |
| Calcium carbonate | 2800° F | 3200° F | .073 | Some smoke throughout firing, fair coolant |
| Ammonium oxalate + Teflon | 2700° F | 3000° F | .099 | Excellent alumina filtration with only little smoke, good coolant |
| Ammonium chloride + Teflon | 2600° F | 2700° F | .056 | Exhaust nozzle plugged with coolant, fair coolant |
| Ammonium fluoride + PVA | 2200° F | 2750° F | .093 | Excellent alumina filtration with little smoke, very good coolant |
| Ammonium acetate + PVA | 2000° F | 2550° F | .094 | Excellent alumina filtration with some smoke, very good coolant |

*MASS FLOW RATE; LB/SEC.

Filter section 14 comprises a plurality of baffles or filter elements preferably manufactured from a refractory material, for example, pressed graphite. The first or entrance baffle 22 is cup-shaped with a central opening 24 substantially coextensive with the bore 19 of coolant 18. The peripheral flange 25 of member 22 faces toward the rear of the unit. The baffle member 26, next in line in the filter section, is also cup-shaped and commensurate with the first cup member 22. Baffle member 26 has four ports or passageways 27 therethrough as more clearly shown in FIGS. 2 and 3. The next succeeding baffle member 28 also cup-shaped contains sloping ports or passageways 29 which slope in the opposite direction from ports 27 in baffle 26.

Although the embodiment shown has only two baffles with slanting port geometries, it is anticipated that more than two such baffles could be advantageously used in some applications. The filter section terminates with an insulative end wall or exit baffle 30.

Figures 2, 3:
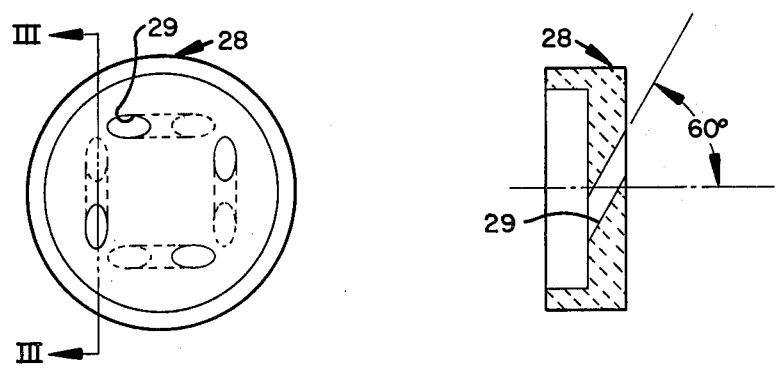
FIG. 2 is a plan view of the aft vortex member of FIG. 1, slightly enlarged.
FIG. 3 is a cross-sectional view of the vortex member taken along lines III—III of FIG. 2.

FIG. 2 is a plan view of the filter element 28 of FIG. 1 taken in the direction of the arrows indicated at II—II in FIG. 1. The four ports 29 shown in FIG. 2 are slanted at about 60° from the horizontal as shown in FIG. 3. The rotational direction of the ports in baffle 28 are reversed in relation to the preceding baffle 26. The net effect is that the high rotational velocity of the vortex generated by gases passing through these ports is used to separate by momentum the particulate contaminates which may be in the gas stream. The contaminates continue under centrifugal force to the perimeter of the filter where they collect in a mass. This filtering technique provides for the capability of greatly reducing the required filter volume while maintaining or improving the filtering effectiveness.

What is claimed is:

1. For use in conditioning gases bled from a rocket chamber, a filter cooler comprising:
   a housing;
   a hollow block of solid material in said housing acting as a conduit for said gases and endothermically reacting therewith;
   a plurality of filter elements successively mounted in said housing collectively providing a tortuous path for conduit of said gases after a passage through said hollow block;
   each said filter element having a plurality of ports passing angularly therethrough causing said gases to form a vortex upon leaving said element;
   said ports in each said filter element being angled in a direction opposite that of said ports in each said successive filter element, whereby said gases are forced to sharply reverse direction upon entering each successive filter element.

2. The device of claim 1 wherein,
   said gases are bled from a rocket chamber through an insulated tube having a central bore;
   said hollow block having a central bore substantially coaxial with the central bore of said tube; and
   said central bore of said hollow block being considerably larger than the central bore of said tube.

3. The device of claim 2 wherein said hollow block is surmounted on the effluent end thereof by a refractory baffle having a central opening substantially coaxial with and commensurate in cross sectional area with the initial central bore of said block.

4. The device of claim 3 wherein said ports pass through said filter elements at an angle of about 60° to the horizontal.

5. The device of claim 2 wherein said ports pass through said filter elements at an angle of about 60° to the horizontal.

6. The device of claim 1 wherein said ports pass through said filter elements at an angle of about 60° to the horizontal.

7. The device of claim 6 further comprising an annular exit baffle;
   each said filter element being cup shaped and congruent in peripheral form each with the other and with said exit baffle; and
   said elements being arranged with the open side facing said exit baffle;
   so that a series of vortex chambers are formed between said elements and between the terminal element and said exit baffle.

8. The device of claim 1 further comprising an annular exit baffle;
   each said filter element being cup shaped and congruent in peripheral form each with the other and with said exit baffle; and
   said elements being arranged with the open side facing said exit baffle;
   so that a series of vortex chambers are formed between said elements and between the terminal element and said exit baffle.

9. The device of claim 7 wherein said hollow block consists of a solidified mixture of 84%–90% decomposable chemical coolant and 16%–10% plastic binder, by weight.

* * * * *